United States Patent [19]

Eckelt et al.

[11] 4,183,875
[45] Jan. 15, 1980

[54] SUBSTITUTED MELAMINE ADDITIVES USEFUL IN MOLDING COMPOSITIONS BASED ON THERMOSETTING RESINS

[75] Inventors: Michael Eckelt, Düsseldorf; Rudi Heyden, Erkrath; Manfred Jaeckel, Loxstedt; Manfred Petzold, Dusseldorf-Holthausen; Kurt Worschech, Bexhövede, all of Fed. Rep. of Germany

[73] Assignee: Neynaber Chemie GmbH, Loxstedt, Fed. Rep. of Germany

[21] Appl. No.: 721,371

[22] Filed: Sep. 8, 1976

[30] Foreign Application Priority Data

Sep. 12, 1975 [DE] Fed. Rep. of Germany ....... 2540616

[51] Int. Cl.$^2$ .............................................. C08L 61/28
[52] U.S. Cl. ..................................... 525/6; 260/19 A; 260/21
[58] Field of Search ... 260/849, 839, 19 A (U.S. only), 260/21 (U.S. only), 30.2 (U.S. only), 67.6 R (U.S. only), 249.6 (U.S. only); 264/300

[56] References Cited

U.S. PATENT DOCUMENTS

| | | | |
|---|---|---|---|
| 2,454,495 | 11/1948 | Widmer et al. | 260/21 |
| 2,709,693 | 5/1955 | Widmer | 260/249.6 |
| 3,506,661 | 4/1970 | Enders et al. | 260/249.6 |
| 3,530,086 | 9/1970 | Porret et al. | 260/30.2 |
| 3,647,755 | 3/1972 | Giller | 260/67.6 R |
| 3,806,480 | 4/1974 | Leonard | 260/67.6 R |

OTHER PUBLICATIONS

Kirk-Othmer, "Encyclopedia of Chemical Technology", 2nd Ed., V. 15, pp. 770-771.

*Primary Examiner*—Lorenzo B. Hayes
*Assistant Examiner*—Amelia B. Yarbrough
*Attorney, Agent, or Firm*—Hammond & Littell

[57] ABSTRACT

A substituted melamine additive being a mixture of the formula

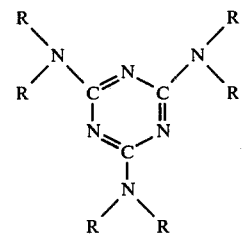

wherein the six R substituents represent the following:
(a) 0 to 3 are hydrogen;
(b) 1 to 5 are R′—OCH$_2$—, wherein R′ is a member selected from the group consisting of hydrogen and alkyl having from 1 to 4 carbon atoms;
(c) 1 to 4 are substituents selected from the group consisting of R$^2$OCH$_2$—, R$^2$COOCH$_2$—, R$^2$CONHCH$_2$—, mixtures thereof, wherein R$^2$ is a hydrocarbon group having 8 to 28 carbon atoms, and
(d) 0 to 2 are substituents selected from the group consisting of Z—CH$_2$—O—CH$_2$— and Z—CH$_2$—, wherein Z is a melamine group of the formula

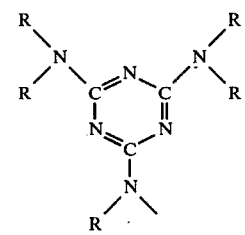

The substituted melamine additives are useful as additives in molding compositions based on thermosetting condensation resins to improve the moldability of the composition.

10 Claims, 2 Drawing Figures

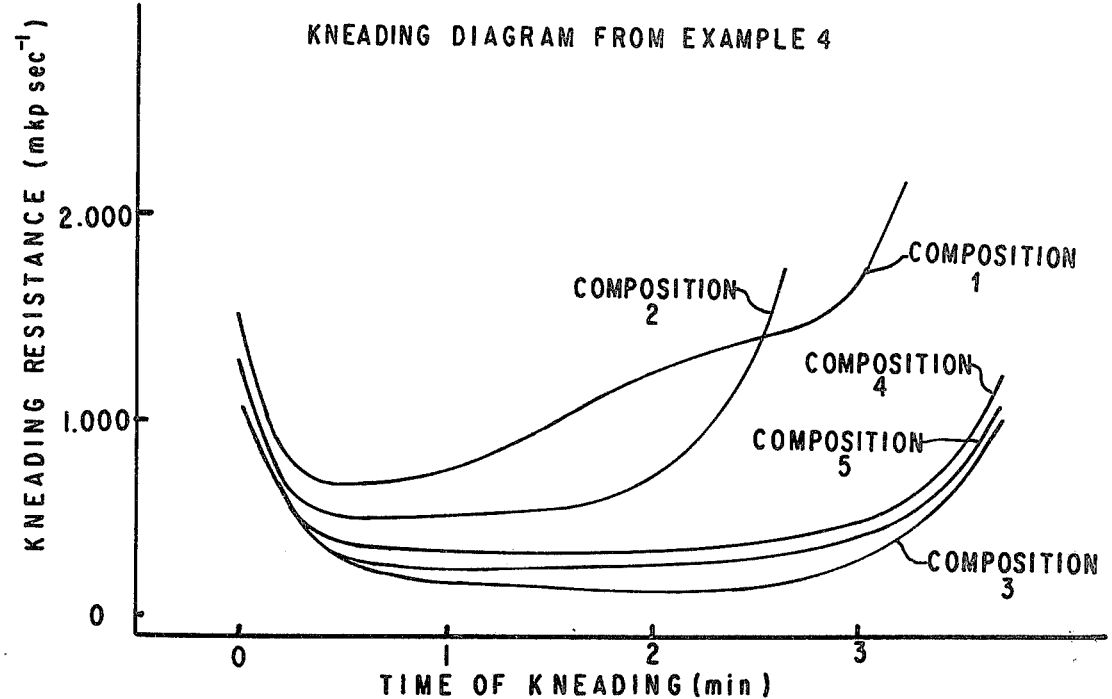
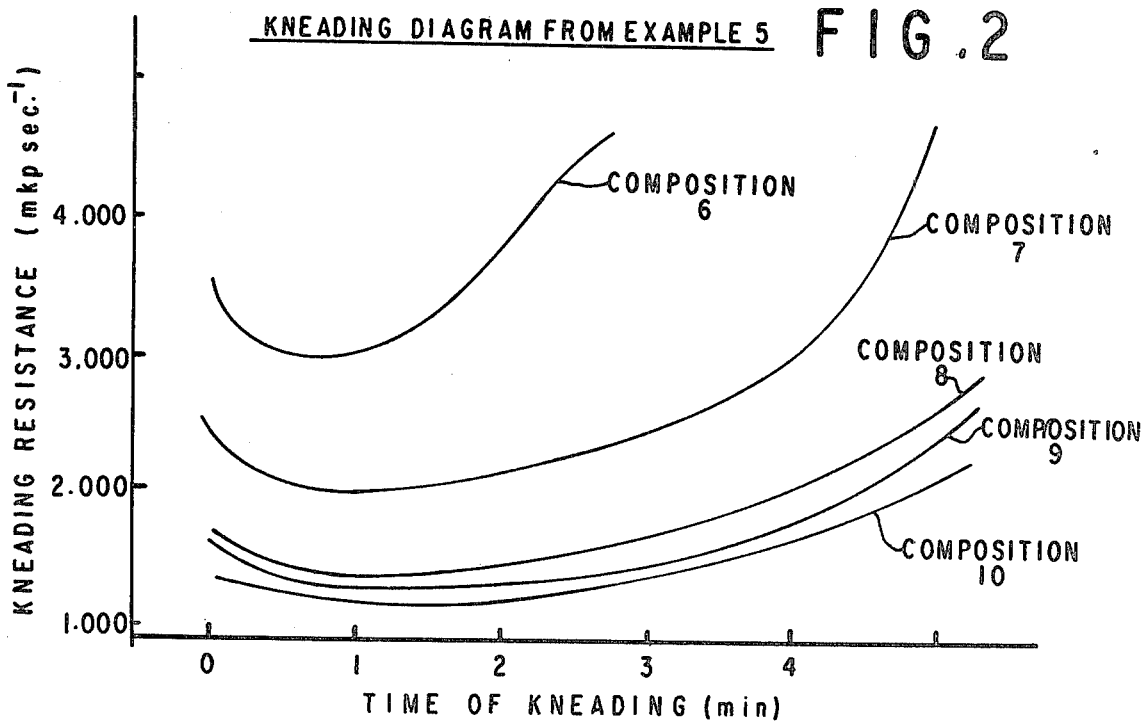

SUBSTITUTED MELAMINE ADDITIVES USEFUL IN MOLDING COMPOSITIONS BASED ON THERMOSETTING RESINS

RELATED ART

Thermosetting moldable compositions contain as essential constituents binding agents, which, when subjected to heat and pressure, can be cross-linked to effect an irreversible polycondensation. The most important binding agents are precondensed resins, either phenoplasts (phenolic resins) of the resol or novolak type, obtained by condensation of phenol, cresols, xylenols, naphthols or polyhydric phenols with formaldehyde, polymeric formaldehyde or other aldehydes, or aminoplast resins, obtained by condensation of urea, guanidine, substituted ureas, melamine, substituted melamines or aniline with formaldehyde, polymeric formaldehyde, furfural or other aldehydes. A moldable composition can also contain various binding agents side by side, for example, a phenolic resin-novolak and a melamine-formaldehyde resin.

In addition to the characteristic binding agents, hardenable moldable materials additionally contain cross-linking compounds such as hexamethylenetetramine, hardening accelerators such as magnesium oxide, fillers such as chalk, asbestos, cellulose or wood flour, pigments, plasticizers, stabilizers and lubricants.

The lubricants are of decisive importance for the moldability of thermosetting moldable compositions. In the process of shaping by pressing, transfer molding or injection molding, lubricants are intended to improve the flow of the material, in order to ensure a satisfactory filling of the mold. Moreover, they should facilite the removal of the hardened finished part from the mold and, therefore, make the troublesome treatment of the mold with an external mold release agent unnecessary. The cooperation of improvement in flow and internal mold release should produce a closed and smooth surface for the finished parts.

In order to obtain a homogeneous distribution, the lubricants are preferably added during the preparation of the resins, but, at latest, they may be added during the conversion of the moldable compositions into mold press powders, chips, granulates or tablets, in order to prevent sticking of the materials and premature hardening when mixing on roll mills, granulating extruders or pelleting machines.

Stearic acid and other fatty acids, metal soaps of fatty acids, such as calcium stearate, zinc stearate, magnesium stearate and aluminum stearate, of different basicities and, in addition, natural waxes such as beeswax or carnauba wax, synthetic wax, such as montanic acid esters, cetyl palmitate, stearyl stearate or ethylenediaminedistearate, paraffin wax of various origins, mineral oils and tar oils, were hitherto chiefly used as lubricants.

The previously used or proposed lubricants have not been completely satisfactory. This is true especially when all stages of the resin manufacture, molding compositions' production and the shaping process are considered. Thus, in the case of the above lubricants, it is difficult to attain a satisfactory distribution of them in the moldable composition. This occurs especially when the precondensed resins are in the form of an aqueous solution or dispersion. The hydrophobic character of the said lubricants then prevents a uniform distribution. An insertion of hydrophilic lubricants, as, for example, ethylene oxide adducts of aliphatic mono- to polyhydric alcohols or their carboxylic acid esters, indeed, produces a good distribution in the molding compositions; the use in higher amounts, however, leads to their exudation from the molded piece during the hardening reaction. If one tries to reduce the disadvantages of this exudation during the molding process, by using small added amounts of lubricants, their influence on the flowability of hardenable moldable composition is no longer sufficient to eliminate a premature hardening by frictional heat, especially in the injection molding process.

A further disadvantage of the previously used lubricants is that for the development of a sufficient mold release action, they must undergo a buildup at the surface of the mold element, which is produced by the pressure employed during the shaping. Consequently, a good release from the mold is obtained, but the lubricant buildup on the mold surface is not completely removed with the molded part. On the contrary, residues are left behind on the surface of the metal mold, which increase in the course of many successive molding operations, so that, as a result, there are changes of dimension of the molds and, consequently, of the molded articles. It is particularly disadvantageous that often these lubricant residues are thermally cracked on the metal mold and, therefore, strong surface discolorations are caused in the production of light-colored molded articles.

It was not previously possible to satisfy all the requirements in technical processing with one lubricant. The metal soaps of fatty acids, indeed, cause the best mold release, but their influence on the viscosity of the melt is too small, especially for plasticizing in the injection molding process. It has, further, already been attempted to combine different kinds of actions by a combination of several lubricants, for example, metal soaps and mineral oils. In such cases, however, the already present difficulties of the compatibility of the individual lubricants, and also their opposite displacement effects, still exist.

As is to be seen from the above discussion, attempts have not been lacking to overcome the difficulties occurring during the shaping of thermosetting condensation resin molding compositions. In spite of all efforts, however, this task could not previously be solved satisfactorily.

THE DRAWINGS

FIGS. 1 and 2 are kneading diagrams of compositions of the invention.

OBJECTS OF THE INVENTION

An object of the present invention is the development of an additive for addition to moldable compositions based on thermosetting condensation resins which overcomes the above enumerated drawbacks and gives a readily shapable moldable composition.

Another object of the present invention is the development of a substituted melamine additive mixture of the formula

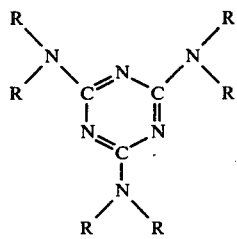

wherein the six R substituents represent members selected from the group consisting of the following:
(a) 0 to 3 R substituents are hydrogen,
(b) 1 to 5 R substituents are R'—OCH$_2$—, wherein R' is a member selected from the group consisting of hydrogen, alkyl having from 1 to 4 carbon atoms, and mixtures thereof,
(c) 1 to 4 R substituents are members selected from the group consisting of R$^2$—OCH$_2$—, R$^2$—COOCH$_2$—, R$^2$—CONHCH$_2$—, and mixtures thereof, wherein R$^2$ is a group having from 8 to 22 carbon atoms selected from the group consisting of alkyl, alkenyl, hydroxyalkyl, hydroxyalkenyl, phenylalkyl, and mixtures thereof, and
(d) 0 to 2 R substituents are members selected from the group consisting of Z—CH$_2$OCH$_2$—, Z—CH$_2$—, and mixtures thereof, wherein Z is a monovalent melamine group of the formula

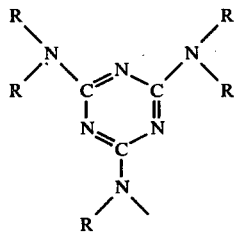

A yet further object of the present invention is the development, in the process of shaping moldable composition based on thermosetting condensation resins which comprises the steps of adding at least one lubricant to said moldable composition, subjecting the lubricated moldable composition to the action of temperature and pressure in a shaping operation, and recovering a shaped non-fusible condensate, the improvement consisting of utilizing from 0.1% to 10% by weight of said moldable composition of the substituted melamine additive mixture above as the lubricant.

These and other objects of the present invention will become more apparent as the description thereof proceeds.

DESCRIPTION OF THE INVENTION

It has now been found that all the above-mentioned disadvantages can be avoided and the above objects can be achieved if an additive is employed in moldable compositions based on thermosetting condensation resins, which are to be further shaped. This additive is a compound of the formula

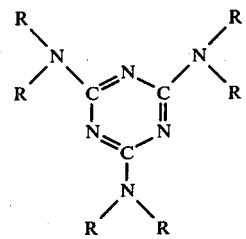

in which the six substituents R have the following meaning:
(a) 0 to 3 of the substituents are hydrogen;
(b) 1 to 5, preferably 2 to 4, of the substituents are R'OCH$_2$— groups, in which R' represents hydrogen or an alkyl group having 1 to 4 carbon atoms;
(c) 1 to 4, preferably 3, of the substituents are R$^2$OCH$_2$—, R$^2$COOCH$_2$— and/or R$^2$CONHCH$_2$— groups, in which R$^2$ represents a hydrocarbon group having 8 to 28 carbon atoms,
(d) 0 to 2 of the substituents are Z—CH$_2$OCH$_2$— or Z—CH$_2$— groups, in which Z represents a melamine group of the above general formula indicated.

Mixtures of compounds, which correspond to the general formula indicated, may also be used as color-stable additives for moldable compositions based on thermosetting condensation resins.

More particularly, therefore, the present invention relates to a substituted melamine additive mixture of the formula

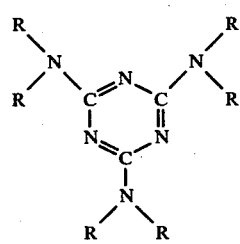

wherein the six R substituents represent members selected from the group consisting of the following:
(a) 0 to 3 R substituents are hydrogen,
(b) 1 to 5 R substituents are R'—OCH$_2$—, wherein R' is a member selected from the group consisting of hydrogen, alkyl having from 1 to 4 carbon atoms, and mixtures thereof,
(c) 1 to 4 R substituents are members selected from the group consisting of R$^2$—OCH$_2$, R$^2$—COOCH$_2$—, R$^2$—CONHCH$_2$—, and mixtures thereof, wherein R$^2$ is a group having from 8 to 22 carbon atoms selected from the group consisting of alkyl, alkenyl, hydroxyalkyl, hydroxyalkenyl, phenylalkyl, and mixtures thereof, and
(d) 0 to 2 R substituents are members selected from the group consisting of Z—CH$_2$OCH$_2$—, Z—CH$_2$—, and mixtures thereof, wherein Z is a monovalent melamine group of the formula

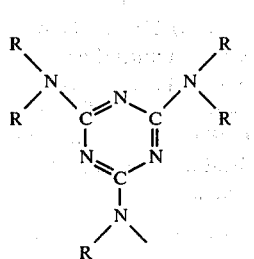

The lubricant additives, according to the invention, may be used, in contrast to the known state of the art, also in higher amounts, since they show no exudation phenomena. The melamine derivatives, according to the invention, are advantageously used in an amount from 0.1% to 20% by weight, preferably 0.2% to 10% by weight, and especially 0.5% to 5% by weight, referred to the total amount of the condensation resin.

The present invention, therefore, also relates to the improvement in the process of shaping moldable composition based on thermosetting condensation resins which comprises the steps of adding at least one lubricant to said moldable composition, subjecting the lubricated moldable composition to the action of temperature and pressure in a shaping operation, and recovering a shaped non-fusible condensate, the improvement consisting of utilizing from 0.1% to 20% by weight of said moldable composition of the substituted melamine additive mixture recited above as the lubricant.

Of course, the invention also relates to the moldable compositions based on thermosetting condensation resins which contain the above-substituted melamine additive mixture as a lubricant additive.

The preparation of the substituted melamine additive mixture according to the invention is effected in a known manner by reacting polyalkoxymethyl-melamine compounds with fatty acids, fatty alcohols and fatty acid amides, the hydrocarbon groups of which have 8 to 22 carbon atoms, or their mixtures at temperatures between 80° and 200° C. and possibly under reduced pressure, for a time sufficient to cause some interchange of long-chain groups.

Examples of polyalkoxymethyl-melamine compounds which may be used are trimethoxymethyl-melamine, hexamethoxymethyl-melamine, triethoxymethyl-melamine, tetraethoxymethyl-melamine, hexaethoxymethyl-melamine, tributoxymethyl-melamine, pentabutoxymethyl-melamine or hexabutoxymethyl-melamine. The polyalkoxymethyl groups are the $R'-OCH_2-$ groups where $R'$ is alkyl having 1 to 4 carbon atoms. However, commercial technical polyalkoxymethyl-melamine mixtures, which, besides almost exclusively hexaalkoxymethylated melamine, contain a few percent of polynuclear melamine derivatives, may also be used.

Examples of the acid component of the reaction products to be used as additives according to the invention having the $R^2COOCH_2-$ groups are fatty acids obtainable from the naturual fats and oils such as lauric acid, myristic acid, palmitic acid, stearic acid, oleic acid, linoleic acid and fatty acid mixtures such as stearic acid-palmitic acid mixtures, tallow fatty acid and coconut fatty acid mixtures, and also branched-chain carboxylic acids such as isopalmitic acid or isostearic acid and substituted fatty acids such as phenylstearic acid, hydroxystearic acid or ricinoleic acid.

The reaction of the polyalkoxymethyl-melamine with fatty alcohols to give additives having the $R^2OCH_2-$ group may be carried out, for example, with caprylyl, lauryl, palmityl, stearyl, oleyl and elaidyl alcohols, while, if desired, an acid catalyst such as p-toluene-sulfonic acid can also be used.

In the reaction with acid amides to give additives having the $R^2CONHCH_2-$ groups, for example, the amides of the above-mentioned fatty acids may be used.

The new additives for moldable compositions based on thermosetting condensation resins, with respect to their actions facilitating the further processing of the moldable compositions, are marked specially by their good color stability at high temperatures and, for example, are, therefore, very suitable for the production of light-colored high-grade melamine resin molding compositions.

A further decisive advantage of the lubricant additives according to the invention is their ability to react with the components of the resin mixture under hardening conditions for duroplasts and at the end of the hardening process, do themselves become a component of the duroplast resin. For this reason, when higher amounts are used, they also show no exudation during the shaping process and when the finished parts are used. The lubricating properties of the new additives remain, however, up to the final hardening.

The additives according to the invention may be added to the moldable compositions after the preparation of the precondensation resin in any stage of processing, for example during the kneading of aqueous urea-formaldehyde or melamine-formaldehyde resin solutions with cellulose, during the grinding of aminoplast molding compositions in the ball mill, during the rolling of aminoplast molding compositions or during the mixing of the new lubricant additives with pulverulent phenol-novolak-fillers and other additives before their granulation in a twin screw plant. A considerable facilitation of such mixing processes is to be seen in that the new lubricant additives include liquid products and solid substances with graduated melting points, so that additives with optimal properties may be chosen for each process.

In the working up stages in the preparation of thermosetting moldable compositions based on condensation resins, the new lubricant additives prevent the sticking of the materials to the kneader blades or on mixing rollers and consequently make possible a trouble-free incorporation of the fillers. Moreover, on account of the freedom from sticking of the moldable compositions, the lubricant additives prevent premature hardening due to thermally overloading the moldable composition due to friction.

During the shaping process the additive according to the invention develops internal lubricating action in the moldable compositions, in that it reduces the viscosity of the melt. A better filling of the mold is obtained with more accurate dimensional stability and increased freedom from internal tensions. The freedom of the new lubricant additives from sticking, classified as an external lubricating action, prevents a sticking of the hardened molded parts to the surfaces of the molds, so that the molded parts are released from the mold without trouble and also without use of mold coating agents (mold release agents).

The present invention will now be further described by means of the following Examples, which are not to be deemed limitative in any manner.

EXAMPLES

(A) Examples of Preparation

Example 1

990 Parts by weight of technical behenic acid were placed in a vessel with an anchor-shaped stirrer, and provided with a gas inlet tube and a return condenser and heated to 80° to 90° C. while passing through nitrogen. 390 Parts by weight of technical hexamethoxymethylmelamine were added and mixed, so that the molar ratio of behenic acid to hexamethoxymethylmelamine amounted to about 3:1. Then the pressure was reduced to about 20 torr and the mixture was heated to 200° C. Under these conditions, the mixture was stirred until the acid value had fallen to a value below 10. The mixture was then cooled to 90° to 100° C. and the pressure was equalized by means of the nitrogen inlet. The reaction product was granulated with a flaking roller. A yield of 1260 parts by weight of white product A with a solidifying point of 58.5° C. was obtained.

In the same way the following products were prepared:

| Melamine | Acid | Molar Ratio | Product | Solidification Point(°C.) |
|---|---|---|---|---|
| Hexamethoxymethylmelamine | Behenic acid | 1:2 | B | 51 |
| Hexamethoxymethylmelamine | Stearic acid | 1:3 | C | 45 |
| Hexamethoxymethylmelamine | Stearic acid | 1:2 | D | 36 |
| Hexamethoxymethylmelamine | Isopalmitic acid | 1:3 | E | liquid |
| Hexamethoxymethylmelamine | Oleic acid | 1:3 | F | liquid |
| Hexamethoxymethylmelamine | Wax acid (cerotic acid) | 1:1.5 | G | 63 |
| Hexabutoxymethylmelamine | Behenic acid | 1:2 | H | 49 |
| Hexabutoxymethylmelamine | Oleic acid | 1:3 | I | liquid |

Example 2

In the apparatus described in Example 1, 812 parts by weight of n-octadecanol were melted while passing in nitrogen and stirred with 390 parts by weight of hexamethoxymethylamine. The molar ratio of stearyl alcohol to the hexamethoxymethylmelamine was about 3:1. 3 to 3.5 parts by weight of p-toluenesulfonic acid were added and the mixture was heated to about 130° C. at normal pressure. The mixture was stirred at this temperature until the amount of free fatty alcohol fell to less than 10%. The mixture was then cooled to 80° C. and the p-toluenesulfonic acid was neutralized with an alkanolamine, for example, with dimethylmonoethanolamine. The neutralized reaction product was flaked. 1090 Parts by weight of a white product K are thereby obtained with a solidification point of 39° C.

Example 3

580 Parts by weight of stearic acid and 290 parts by weight of stearic acid amide were placed in the apparatus described in Example 1 and heated to 90° to 100° C. while passing in nitrogen. 390 Parts by weight of technical hexamethoxymethylmelamine were then admixed. The molar ratio of the three components amounted in the above series to about 2:1:1. The pressure was then reduced to about 100 mm mercury and the reaction mixture was heated to 200° C. Under these conditions, the mixture was stirred until the acid value fell to below 10. The mixture was then cooled and the vacuum relieved by passing in nitrogen. The reaction product was then flaked. 1130 Parts by weight of white to slightly yellow colored product L with a solidification point of 43° C. were obtained.

(B) Examples of Use

Example 4

In a high-speed mixer, moldable masses or compositions of the following recipes (in parts by weight) were prepared, giving a pulverulent mixture:

| Composition 1: | 60 melamine-formaldehyde resin powder |
| --- | --- |
| | 40 cellulose powder |
| Composition 2: | 100 composition 1 |
| | 1 zinc stearate |
| Composition 3: | 100 composition 1 |
| | 1 reaction product B (reaction product of 1 mol of hexamethoxymethylmelamine and 2 mols of behenic acid) |
| Composition 4: | 100 composition 1 |
| | 1 reaction product C (reaction product of 1 mol of hexamethoxymethylmelamine and 3 mols of stearic acid) |
| Composition 5: | 100 composition 1 |
| | 1 reaction product E (reaction product of 1 mol of hexamethoxymethylmelamine and 3 mols of isopalmitic acid) |

These five moldable compositions were tested in a "Brabender" plastograph for their flow-hardening behavior, under the following conditions:

Kneading chamber with 30 cm$^3$ capacity and a jacket temperature of 135° C., amount fed 30 gm, blade speed 30 rpm.

The kneading diagrams obtained are shown in FIG. 1 of the accompanying drawings. These demonstrate that the moldable compositions 3, 4 and 5, owing to the lubricating action of the additives B, C and E according to the invention, had considerably lower kneading resistance (mkp sec$^{-1}$) than the moldable compositions 1 and 2. Since the lubricant additives according to the invention, moreover, prevent excessive friction, the hardening of the corresponding molding compositions occurred after a longer time.

Example 5

In a high-speed mixer the following moldable compositions (in parts by weight) of a pulverulent nature were prepared:

| Composition 6: | 60 melamine-formaldehyde resin powder |
| --- | --- |
| | 40 chalk |
| Composition 7: | 100 composition 6 |
| | 1 zinc stearate |
| Composition 8: | 100 composition 6 |
| | 1 reaction product H (reaction product of 1 mol of hexabutoxymethylmelamine and 2 mols of behenic acid) |
| Composition 9: | 100 composition 6 |
| | 1 reaction product K (reaction product of 1 mol of hexamethoxymethylmelamine and 3 mols of |

| | |
|---|---|
| Composition 10: | stearyl alcohol)<br>100 composition 6<br>1 reaction product L (reaction product of 1 mol of hexamethoxymethylmelamine, 2 mols of stearic acid and 1 mol of stearic acid amide) |

These five moldable compositions were tested in a "Brabender" plastograph for their flow-hardening behavior under the following conditions:

Kneading chamber with 30 cm³ capacity and a jacket temperature of 135° C., amount fed 30 gm, blade speed 30 rpm.

The kneading diagrams obtained, shown in FIG. 2 of the accompanying drawings, showed that the kneading resistance (mkp sec$^{-1}$) of the moldable compositions 8, 9 and 10 were lower, owing to the lubricating action of the additives H, K and L according to the invention, in comparison with the values of the moldable compositions 6 and 7 of the prior art.

Example 6

In order to test the compatibility and fastness after reaction of the lubricant additives according to the invention, molded plates were prepared with the moldable compositions 1 to 10 from Examples 4 and 5 at a hardening temperature of 160° C. and examined for any formation of a coating. The plates using compositions 1 and 6 (no lubricant) and the compositions 3 to 5 and 8 to 10 (with lubricant according to the invention) were free from any formation of coatings after the hardening. In the case of the molded plates from the compositions 2 or 7, a strong formation of a coating caused by exudation of zinc stearate was apparent.

Example 7

The color stability of the lubricant additive was examined in a heat test. In this the products were heated at 180° C. for an hour and then tested for color changes and other alterations. The results of these tests are given below:

| Lubricant | Initial Color | Alterations |
|---|---|---|
| Zinc stearate | colorless | brown |
| Guanidine stearate | yellowish | brown, foam formation |
| A | white | none |
| B | white | none |
| C | weak yellow | none |
| E | colorless | none |
| G | yellowish | none |
| H | weak yellow | none |
| K | white | none |
| L | weak yellow | none |

The lubricant additives according to the invention are marked by extraordinarily good heat stability, they are not discolored even after relatively long heating and also show no alterations.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. The process of shaping moldable composition based on thermosetting condensation resins selected from the group consisting of phenoplasts and aminoplasts which comprises the steps of adding at least one lubricant to said moldable composition, subjecting the lubricated moldable composition to the action of temperature and pressure in a shaping operation, and recovering a shaped non-fusible condensate, the improvement consisting of utilizing from 0.1% to 20% by weight of said moldable composition of a substituted melamine additive mixture of the formula:

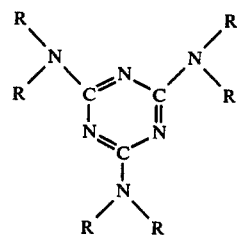

wherein the six R substituents represent members selected from the group consisting of the following:
(a) 0 to 3 R substituents are hydrogen,
(b) 1 to 5 R substituents are R'—OCH$_2$—, wherein R' is a member selected from the group consisting of hydrogen, alkyl having from 1 to 4 carbon atoms, and mixtures thereof,
(c) 1 to 4 R substituents are members selected from the group consisting of R$^2$OCH$_2$—, R$^2$—COOCH$_2$—, R$^2$—CONHCH$_2$—, and mixtures thereof, wherein R$^2$ is a group having from 8 to 22 carbon atoms selected from the group consisting of alkyl, alkenyl, hydroxyalkyl, hydroxyalkenyl, phenylalkyl, and mixtures thereof, and
(d) 0 to 2 R substituents are members selected from the group consisting of Z—CH$_2$OCH$_2$—, Z—CH$_2$—, and mixtures thereof, wherein Z is a monovalent melamine group of the formula:

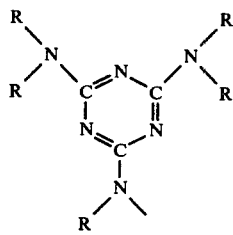

as said lubricant.

2. The process of claim 1 wherein said substituted melamine additive mixture is utilized in an amount of from 0.2% to 10% by weight of the moldable composition.

3. The process of claim 1 wherein said substituted melamine additive mixture is utilized in an amount of from 0.5% to 5% by weight of the moldable composition.

4. The process of claim 1 wherein, in said substituted melamine additive mixture, 2 to 4 R substituents are R'—OCH$_2$—.

5. The process of claim 1 wherein, in said substituted melamine additive mixture, 3 R substituents are selected from the group consisting of R$^2$—OCH$_2$—, R$^2$—COOCH$_2$—, R$^2$—CONHCH$_2$—, and mixtures thereof.

6. The process of claim 1 wherein, in said substituted melamine additive mixture, R' is alkyl having from 1 to 4 carbon atoms.

7. The process of claim 1 wherein, in said substituted melamine additive mixture, 1 to 4 R substituents are $R^2$—COOCH$_2$—.

8. The process of claim 1 wherein, in said substituted melamine additive mixture, 1 to 4 R substituents are $R^2$—OCH$_2$—.

9. The process of claim 1 wherein, in said substituted melamine additive mixture, 1 to 4 R substituents are mixtures of $R^2$—COOCH$_2$— and $R^2$—CONHCH$_2$—.

10. The process of claim 1 wherein said thermoplastic condensation resins are melamine-formaldehyde resins.

* * * * *